United States Patent Office 2,936,213
Patented May 10, 1960

2,936,213
PROCESS OF REDUCING PLUTONIUM TO TETRAVALENT STATE

Donald F. Mastick, Napa, Calif., assignor to the United States of America as represented by the United States Atomic Energy Commission No Drawing. Application June 12, 1947
Serial No. 754,265

7 Claims. (Cl. 23—14.5)

This invention relates to a method of reducing plutonium compounds and, more particularly, to a method of separating plutonium from impurities.

It is often desired to purify plutonium compounds from a number of impurities which may be, for example, either those that remain after a partial purification of plutonium produced by neutron irradiation of uranium or which may be impurities which have been introduced inadvertently into pure plutonium compounds. In many of the procedures developed for purifying the plutonium, it is desirable to change the valence state of the plutonium to obtain the desired solubility of the particular compounds with reference to certain liquids such as ether or water.

In particular, it is often desired to reduce the plutonium from the higher valence state, in which state most of its compounds are soluble, to a lower valence state in which many of its compounds are insoluble. There are a number of known compounds of plus three plutonium which are water-insoluble, such as plutonium trifluoride or plutonium oxalate, and most of them are insoluble in organic solvents.

The primary object of this invention is to provide a method for reducing plutonium in a higher oxidation state to the plus three oxidation state.

An additional object of this invention is to provide a method for purifying plutonium from impurities by reducing a plutonium compound from a higher soluble oxidation state to a plus three oxidation state in which it forms insoluble compounds.

A further object of this invention is to establish a method for treating impure plutonium by reacting it with a reducing agent which reduces the plutonium to a plus three state but which does not reduce the impurities thus enabling the impurities to be separated.

A still further object of this invention is to provide a method for selectively purifying plutonium from uranium by treating impure plutonium with a selective reducing agent which reduces the plutonium to the plus three state while leaving the uranium in the higher oxidation state thus enabling the plutonium to be separated from the uranium.

Another object of this invention is to furnish a method for reducing plutonium from the higher oxidation state to the plus three valence state without introducing undesirable ions.

The objects of this invention are generally achieved by the process which comprises treating a soluble compound of plutonium in the higher oxidation state with hydrogen peroxide to reduce the plutonium to the plus three state. It has been found that hydrogen peroxide as a reducing agent has the proper oxidation-reduction potential to effect the reduction. Its oxidation-reduction potential at standard conditions, i.e., referred to hydrogen-hydrogen ion couple as zero, and for unit activities and temperatures at 25° C. is given by the following equation:

Volts
$H_2O_2 = O_2 + 2H^+ + 2e^-$ ———————————— —0.68

The standard oxidation-reduction potential in one molar nitric acid for the relevant plutonium couples under the same conditions has been determined to be as follows:

Volts
$Pu^{+3} = Pu^{+4} + e^-$ ———————————— —0.92
$Pu^{+4} + 2H_2O = PuO_2^{++} + 4H^+ + 2e^-$ ———— —1.14

It may thus be seen that the subject hydrogen peroxide reducing agent which is more positive than —0.92 volt has a standard oxidation-reduction potential which may reduce the plutonium.

The standard potential of uranium plus four-uranium plus six couple under standard conditions is as follows:

Volts
$U^{+4} + 2H_2O = UO_2^{++} + 4H^+ + 2e^-$ ———————— —0.41

Consequently, the hydrogen peroxide with its potential of —0.68 volt will preferentially reduce the plutonium to the plus three state while leaving the uranium in the plus six state.

The reaction that occurs when the hydrogen peroxide is added to the plus four or plus six plutonium solution is believed to be as follows:

$$2Pu^{+4} + H_2O_2 = 2Pu^{+3} + O_2\uparrow + 2H^+$$
$$2PuO_2^{++} + 3H_2O_2 + 2H^+ = 2Pu^{+3} + 4H_2O + 3O_2\uparrow$$

Thus it requires a half mole of hydrogen peroxide to reduce one mole of plus four plutonium to the plus three state, while it requires one and a half moles of hydrogen peroxide to reduce a mole of plus six plutonium to the plus three state. It is desirable that only a slight excess over the stoichiometric amounts of peroxide be added because under some conditions the hydrogen peroxide may act as an oxidizing rather than a reducing agent and possibly oxidize the lower valence state plutonium according to the following possible reactions:

$$2PU^{+3} + H_2O_2 + 2H^+ = 2Pu^{+4} + 2H_2O$$
$$Pu^{+4} + 2H_2O_2 = PuO_2^{++} + 2H^+$$

Furthermore, plus four peroxide will tend to form if sufficient hydrogen peroxide is present. This plus four plutonium peroxide is soluble in concentrated nitric acid solutions but it is insoluble in dilute nitric acid solutions. This is illustrated by the following table which shows the solubility of plutonium peroxide in different concentrations.

TABLE I

Effect of varying nitric acid concentration on plutonium peroxide solubility at 10°

| Normality of the nitric acid: | Solubility, mg. Pu/liter |
|---|---|
| 1 | 21 |
| 2 | 84 |
| 3 | 237 |
| 4 | 767 |
| 5 | 2855 |

It is probable that in a dilute acid solution the plutonium peroxide will precipitate in accordance with the following possible reactions:

$$Pu^{+4} + 2H_2O_2 = PuO_4\downarrow + 4H^+$$
$$PuO_2^{++} + 3H_2O_2 = PuO_4\downarrow + 2H_2O + O_2\uparrow + 2H^+$$

It may be seen that it requires at least twice as much hydrogen peroxide to form the plutonium peroxide precipitate as it does to reduce the plutonium to the plus three state. It is desirable to maintain a large excess of hydrogen ion because this will not only increase the tendency of plus six plutonium to be converted to plus three plutonium but will also tend to prevent the formation of the plutonium peroxide precipitate.

In the event an excess of hydrogen peroxide is added, the excess over the amount needed to reduce the plutonium to the plus three state may be removed by heating the solution. The plutonium peroxide which is formed will of course precipitate if the nitric acid concentration is low. In this case, after the excess hydrogen peroxide has been removed, the plutonium peroxide precipitate may be redissolved by increasing the concentration of the nitric acid solution. The increased hydrogen ion concentration together with the proper amount of hydrogen peroxide will then reduce the plutonium to the plus three state.

It is of course possible in other modifications of the method of this invention to start with pure plutonium peroxide cake. In such embodiments, the plutonium peroxide cake is dissolved carefully in nitric acid. The concentration is then adjusted to the proper range and a predetermined amount of hydrogen peroxide is added, thus converting the plutonium to the plus three state.

The plus three plutonium formed by the method of this invention may be removed from solution by reacting with an anion (e.g., oxalate or fluoride) which forms an insoluble compound with the plutonium in the plus three state. It is desirable that this anion be present or be added rapidly and with constant stirring so that the insoluble plus three plutonium compound will form immediately. This is desirable since the plutonium in the plus three state may be oxidized to the plus four state by a combination of nitrate and hydrogen ions, if present. This reaction is thought to be:

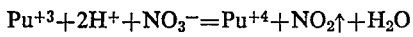

As stated previously, the plutonium may be originally present as a compound which, though soluble in the higher oxidation states, is insoluble in the plus three state, or the solution may contain anions which form an insoluble plus three plutonium compound. As an example, the plutonium may be present as a plus six plutonyl compound with fluoride or oxalate ions in the solution.

Of course, the insoluble plus three plutonium compound that is formed may be removed from the solution by decanting, filtering, centrifuging or any of the various methods known to those skilled in the art for removing solids from a supernatant liquid.

It is possible to start with the plutonium in either of the higher oxidation states; that is, the plus four or the plus six state or in the mixed higher oxidation stages. One embodiment of the method of this invention which is carried out by starting with plutonium in the plus four state, adding an excess of hydrogen peroxide and removing it by heating is illustrated in the following example, which is given for the purpose of illustrating the method of this invention but is not intended to be limiting on the scope thereof.

EXAMPLE I

An aqueous solution containing 0.373 micromole of plus four plutonium hydroxide in 0.612 normal nitric acid is evaporated to dryness. 16 microliters of 0.612 normal nitric acid, 4 microliters of water and 5 microliters of 30 percent hydrogen peroxide are then added, with stirring after each addition. A green precipitate results. 4 microliters of 16 normal nitric acid are then added, causing no immediate change. The solution is gradually heated, causing the precipitate to dissolve in the nitric acid and the solution to turn the plutonyl pink color by the oxidizing action of the hydrogen peroxide. As the peroxide is gradually removed, the solution slowly clears and then turns blue. At this point the plutonium is in the plus three state. 2 microliters of 0.67 molar oxalic acid are added to this plus three plutonium solution, and a green plus three plutonium oxalate precipitate results. In the event that the plutonium is not stabilized in the plus three state, it will revert to the neutral green tan of the plus four state, if all the hydrogen peroxide is evolved from the solution before precipitation, because the nitrate and hydrogen ions then act as an oxidizing agent.

The above example points out the fact that high concentrations of hydrogen peroxide in nitric acid solutions oxidize plutonium from the plus four to the plus six state, but smaller concentrations of hydrogen peroxide reduce the plutonium in the plus six plutonyl state to the plus three state.

The process can, of course, be carried out on a larger scale than the micro scale used in the foregoing example. The following example is an illustration of such a procedure.

EXAMPLE II 160 grams or 0.67 mole of plus four plutonium are present in a liter of 1.5 molar acid. The solution is transferred to the work tank. 16 normal nitric acid is then added and the solution diluted until it consists of 1.5 liters of 3.5 molar nitric acid and 0.447 molar plutonium as the tetranitrate. 150 milliliters of 30 percent hydrogen peroxide are added to the solution. It is then heated to 90° C. to decompose the excess hydrogen peroxide. The solution passes through the plus six oxynitrate (plutonyl state), and is reduced to the trinitrate when substantially all the excess hydrogen peroxide has been removed.

In the preferred embodiment of the method of this invention, a dilute solution containing plus six plutonium nitrate is treated with the reducing agent as shown in the following example.

EXAMPLE III 10 liters of solution which is 0.4 molar in nitric acid and 0.015 molar in plutonium as plus six plutonium nitrate is transferred into the work tank. 16 normal nitric acid is then added until the solution is 4.0 normal in nitric acid. 30 milliliters per minute of 3 molar hydrofluoric acid are then added for 10 minutes while the agitation of the solution continues. The insoluble fluoride precipitates which may be formed are removed by filtration. A 30 percent aqueous solution of hydrogen peroxide is then added at the rate of three milliliters per minute for nine minutes while the solution is constantly agitated. The solution is then slowly heated to 90° C. to remove any excess hydrogen peroxide which might exist. 7.5 milliliters per minute of 3 molar hydrofluoric acid are then added to insure that sufficient fluoride ion is present to form the insoluble plutonium trifluoride. The solution is then allowed to stand for 30 minutes. The precipitate is then washed twice with 1.5 liters of a solution which is 0.5 molar in nitric acid and one molar in hydrogen fluoride. In each case the solution is agitated thoroughly during the addition of the washing solution and is allowed to stand for 30 minutes before decantation. The trifluoride that results is of bluish-purple color.

It may be seen that in this embodiment of the method of the invention, the solution including plutonium compounds and impurities is first treated with the plutonium in the higher oxidation state in the same manner as intended for the ultimate treatment of the reduced plutonium, and then the plutonium is reduced and the treatment completed. This has the advantage that a number of impurities which would contaminate the plutonium are removed in the first step, when the plutonium in the higher oxidation step is treated. The plus three plutonium fluoride that results is free of the impurities which would otherwise precipitate as fluorides.

In other embodiments of the method of the invention, various other soluble salts such as the halides in a higher state of oxidation can be similarly treated and thus reduced to the plus three state.

It may be seen that because the hydrogen peroxide does not introduce any new impurities, either as anions or cations, it is especially desirable for use in reclaiming plutonium which is present in very small concentrations and which is mixed with a large number of impurities. The hydrogen peroxide reduction may be repeated without increasing the amounts of impurities added. If reducing agents other than hydrogen peroxide are used to reclaim this plutonium, added cations may increase to a point where they approach the concentration of the impurities.

Because, as pointed out hereinbefore, the hydrogen peroxide selectively reduces high valence plutonium in the presence of higher valence uranium, the method of this invention may be used for separating plutonium from solutions containing uranium and other impurities. As an example of one such embodiment, a solution containing plutonium and uranium in the plus six state is treated with predetermined quantities of hydrogen peroxide sufficient to reduce the plutonium to the plus three state. The plus three plutonium is then removed as a precipitate by the addition of an anion, such as oxalate, which forms an insoluble plus three plutonium compound, while leaving the plus six uranium in solution.

In other modifications of the method of this invention, advantage may be taken of the fact that a number of solvents, such as diethyl ether, will quantitatively selectively extract plutonium or uranium when they are in the plus six state but will not so extract either of these metals when they are in a lower oxidation state. As an example of such an embodiment, a solution containing plutonium and uranium is treated with a predetermined amount of hydrogen peroxide sufficient to reduce the plutonium to the lower oxidation state. The uranium is then extracted with diethyl ether, which quantitatively extracts uranium in the plus six state. The ether and water phases are then separated. The plutonium in the water phase may be removed as a precipitate in the plus three state.

Alternatively, with other impurities, e.g., any of the other fission products, the solvent extraction procedure may then be used for removing plutonium in the plus six state from these other impurities. The ether phase can then be separated. The plus six plutonium is put into water solution and is treated with hydrogen peroxide to obtain it in a reduced state for removing other impurities such as uranium.

A theory of the reactions has been set out in detail in this specification to explain the method of the invention, but it is not intended that the spirit or scope of this invention be limited by such explanations.

In like manner, the conditions for reduction have been given specifically in the examples and in the above description. However, there are many possible embodiments of the method of the invention without departing from the spirit or scope of the invention, and it is not intended to limit the scope of the invention except as indicated in the appended claims.

What is claimed is:

1. The process of reducing plutonium ions in an oxidation state selected from the class consisting of hexavalent and tetravalent to the trivalent state comprising dissolving a plutonium compound in a strong aqueous nitric acid solution, said plutonium compound being selected from the class consisting of tetravalent plutonium peroxide, tetravalent plutonium hydroxide, tetravalent plutonium nitrate, tetravalent plutonium fluoride, tetravalent plutonium oxalate, hexavalent plutonium fluoride, plutonyl nitrate and plutonyl oxalate, adding at least the stoichiometric quantity of hydrogen peroxide to reduce said plutonium to the trivalent oxidation state, and gently heating said solution to decompose any excess hydrogen peroxide.

2. The process of claim 1 which includes the further steps of adding an acid selected from the class consisting of oxalic acid and hydrofluoric acid, said acid being added in at least the stoichiometric quantity required for combination with said plutonium in its trivalent oxidation state, and separating the resulting plutonium precipitate from the supernatant solution.

3. The process of claim 2 in which said plutonium compound is plutonium tetranitrate.

4. The process of claim 2 in which said plutonium compound is plutonyl nitrate.

5. The process of claim 4 in which said acid is hydrofluoric acid.

6. The process of claim 1 in which said plutonium compound is tetravalent plutonium peroxide and which includes the preliminary step of precipitating said tetravalent plutonium peroxide from a dilute nitrate acid solution containing at least one of the balance of said plutonium compounds by the addition of hydrogen peroxide in a large excess over that required for the reduction of said plutonium to the trivalent oxidation state.

7. The process of separating plutonium from impurity elements including hexavalent uranium, comprising dissolving plutonyl nitrate admixed with said impurities in strong nitric acid, adding hydrofluoric acid, separating the resulting fluoride precipitates of impurities from the supernatant solution, adding hydrogen peroxide to said supernatant solution in at least the quantity required for the reduction of said plutonium to the trivalent oxidation state, gently heating said solution to decompose any excess hydrogen peroxide, adding at least sufficient additional hydrofluoric acid to combine with said trivalent plutonium, and separating the resulting plutonium trifluoride precipitate from the supernatant solution.

References Cited in the file of this patent

UNITED STATES PATENTS 2,785,951     Thompson et al. _____ Mar. 19, 1957

OTHER REFERENCES

Seaborg et al.: "The Actinide Elements," 1st Edition, 1954, pages 579, 580, 594, referring to bibliographic reference number 94, Report CK1221, January 5, 1944, by Brody and Orlemann.

Harvey et al.: "J.A.C.S.," August 1947, pages 1010–1021, received March 6, 1947.

Seaborg, Chemical and Engineering News, vol. 23, No. 23, pages 2190–2193, December 10, 1945.

Mastick and Wahl: AEC Document MDDC–1761, 3 pages, February 22, 1944, declassified February 25, 1948.

Seaborg et al.: "The Actinide Elements," 1st Edition (1954), pages 221–300, and in particular pages 278–285 referring to bibliographic reference numbers 160, 162, 163 and 170 which list on pages 299 and 300 AEC reports, dated variously, but none later than the year 1945.